(12) United States Patent
Lin

(10) Patent No.: US 7,625,426 B2
(45) Date of Patent: Dec. 1, 2009

(54) METHOD FOR MAKING NANO-SCALE FILTER

(75) Inventor: Mong-Tung Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 612 days.

(21) Appl. No.: 11/438,023

(22) Filed: May 19, 2006

(65) Prior Publication Data

US 2007/0051240 A1   Mar. 8, 2007

(30) Foreign Application Priority Data

May 28, 2005   (CN)   ......................... 2005 1 0034954

(51) Int. Cl.
*B01D 53/22* (2006.01)
*B01D 53/02* (2006.01)
*B01D 39/20* (2006.01)

(52) U.S. Cl. .................. 95/45; 95/90; 95/116; 95/273; 95/285; 95/903; 96/4; 96/11; 55/487; 55/522; 55/524; 55/DIG. 5; 210/500.1; 210/500.21; 210/501; 210/502.1; 210/506; 264/628; 264/109; 264/DIG. 48

(58) Field of Classification Search .................. 96/4, 96/11; 95/45, 90, 116, 273, 285, 903; 55/486, 55/487, 522, 524, 527, 528, DIG. 5; 210/500.1, 210/500.21, 501, 502.1, 506; 264/628, 109, 264/DIG. 48

See application file for complete search history.

(56) References Cited

U.S. PATENT DOCUMENTS

| | | | |
|---|---|---|---|
| 6,495,258 B1 * | 12/2002 | Chen et al. | 428/408 |
| 7,014,681 B2 * | 3/2006 | Noack et al. | 95/45 |
| 7,211,320 B1 * | 5/2007 | Cooper et | 428/306.6 |
| 7,323,033 B2 * | 1/2008 | Kroupenkine et al. | 96/11 |
| 7,396,798 B2 * | 7/2008 | Ma et al. | 502/185 |
| 7,419,601 B2 * | 9/2008 | Cooper et al. | 95/903 |
| 2008/0093577 A1 * | 4/2008 | Khraishi et al. | 252/67 |

FOREIGN PATENT DOCUMENTS

JP   2004-18328 A   1/2004

* cited by examiner

*Primary Examiner*—Jason M Greene
(74) *Attorney, Agent, or Firm*—Clifford O. Chi

(57) ABSTRACT

A nano-scale filter (10) includes a porous supporting component (14) and a carbon nanotube filtration membrane (12) sintered on a top surface of the porous supporting component. The porous supporting component has a number of micro-scale pores. The filtration membrane is configured as a network formed by aggregating a number of multi-junction carbon nanotubes. The multi-function carbon nanotubes are selected from the group consisting of two-dimensional junction carbon nanotubes (30, 40, 50, 60), three-dimensional junction carbon nanotubes (20) and an admixture thereof. A method for making the nano-scale filter is also provided.

7 Claims, 2 Drawing Sheets

METHOD FOR MAKING NANO-SCALE FILTER

BACKGROUND

1. Technical Field

The invention relates generally to nano-scale filters, and particularly to a nano-scale filter with a filtration membrane having a high specific surface area and high porosity. The invention also relates to a method for making a nano-scale filter.

2. Related Art

A nano-scale filter is widely used for a variety of purposes, such as filtration of nano-particles, absorption of gas, selective passage of fluid, and so on. A conventional nano-scale filter has a ceramic component and a $\gamma$-$MnO_2$ filtration membrane sintered on the ceramic component. The ceramic component has a plurality of micro-scale pores defined therein. The filtration membrane has a plurality of nano-scale pores formed by spaces between each two adjacent $\gamma$-$MnO_2$ particles. A diameter of each of the nano-scale pores is generally in the range of about 2~3 nanometers. A diameter of each of the $\gamma$-$MnO_2$ particles is generally in the range of about 20~30 nanometers. A diameter of an aggregation formed by the $\gamma$-$MnO_2$ particles is generally in the range of about 100~500 nanometers. A thickness of the filtration membrane is generally in the range of about 10~15 microns. With this configuration, a ratio of the number of pores relative to an area of the filtration membrane is relatively small. Thus, this kind of filter has a relatively low filtration efficiency.

What is needed, therefore, is a nano-scale filter with a high specific surface area and high porosity.

What is also needed is a method for making the above-mentioned nano-scale filter.

SUMMARY

A nano-scale filter includes a porous supporting component and a carbon nanotube filtration membrane sintered on a top portion of the porous supporting component. The filtration membrane includes an aggregation of a number of carbon nanotubes that define a number of nano-scale pores therebetween. The carbon nanotubes includes a number of multi-junction carbon nanotubes. The multi-junction carbon nanotubes are selected from the group consisting of two-dimensional junction carbon nanotubes, three-dimensional junction carbon nanotubes and an admixture thereof A diameter of each of the carbon nanotubes is in the range of about 15~100 nanometers.

A method for making a nano-scale filter includes the steps of:

providing a plurality of carbon nanotubes, said carbon nanotubes comprising a plurality of multi-junction carbon nanotubes, said multi-junction carbon nanotubes being selected from the group consisting of two-dimensional junction carbon nanotubes, three-dimensional junction carbon nanotubes and an admixture thereof, a diameter of each of said carbon nanotubes being in the range of about 15~100 nanometers;

oxidizing said carbon nanotubes, dispersing said carbon nanotubes into a liquid medium to form a suspension;

filtering said suspension by a filtration film;

firing said filtration film with said carbon nanotubes thereon at a temperature of about 20° C.~100° C. in a vacuum for about 1~3 hours, whereby some or all of said carbon nanotubes form bonds with at least one corresponding adjacent carbon nanotube thereby forming a carbon nanotube filtration membrane with a plurality of nano-scale pores therebetween; and removing said carbon nanotube filtration membrane from said filtration film, and attaching said carbon nanotube filtration membrane onto a porous supporting component to provide said nano-scale filter.

Alternatively, another method for making a nano-scale filter includes:

providing a plurality of carbon nanotubes and a porous supporting component, said carbon nanotubes comprising a plurality of multi-junction carbon nanotubes, said multi-junction carbon nanotubes being selected from the group consisting of a two-dimensional junction carbon nanotube, a three-dimensional junction carbon nanotube and an admixture thereof;

oxidizing said carbon nanotubes;

dispersing said carbon nanotubes into a liquid medium to form a suspension;

filtering said suspension by said porous supporting component; and firing said porous supporting component with said carbon nanotubes thereon at a temperature of about 20° C.~100° C. for about 1~3 hours to thereby form the nano-scale filter.

Other advantages and novel features of the present filter and the related manufacturing method will become more apparent from the following detailed description of preferred embodiments when taken in conjunction with the accompanying drawings.

BRIEF DESCRIPTION OF THE DRAWINGS

The components in the drawings are not necessarily to scale, the emphasis instead being placed upon clearly illustrating the principles of the present filter and the related manufacturing method. Moreover, in the drawings, like reference numerals designate corresponding parts throughout the several views. All the views are schematic.

The exemplifications set out herein illustrate at least one preferred embodiment of the present filter and the related manufacturing method, in one form, and such exemplifications are not to be construed as limiting the scope of the invention in any manner.

DETAILED DESCRIPTION

Reference will now be made to the drawings to describe embodiments of the present filter and the related manufacturing method in detail.

Figure 1:
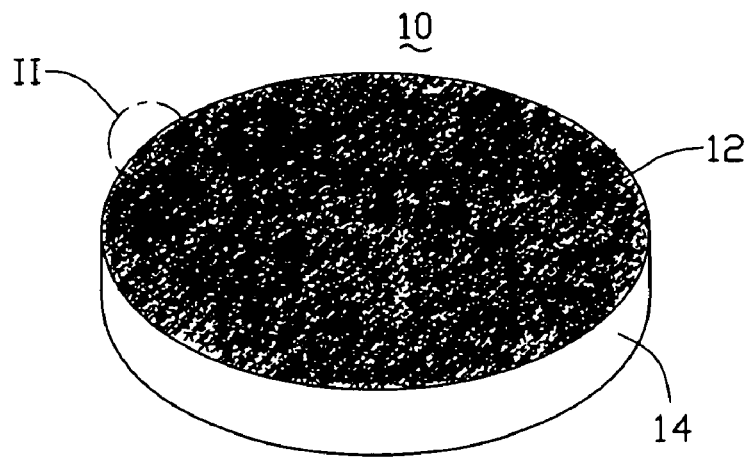
FIG. 1 is an isometric view of a nano-scale filter in accordance with an exemplary embodiment of the present invention.

Referring to FIG. 1, a nano-scale filter 10 in accordance with an exemplary embodiment of the present invention is shown. The nano-scale filter 10 is generally adapted for a variety of purposes, such as filtration of nano-particles, absorption of gas, providing selective passages for fluid reactant, and so on. The nano-scale filter 10 generally includes a carbon nanotube filtration membrane 12 and a porous supporting component 14. The filtration membrane 12 is sintered on a top surface of the porous supporting component 14.

Figure 2:
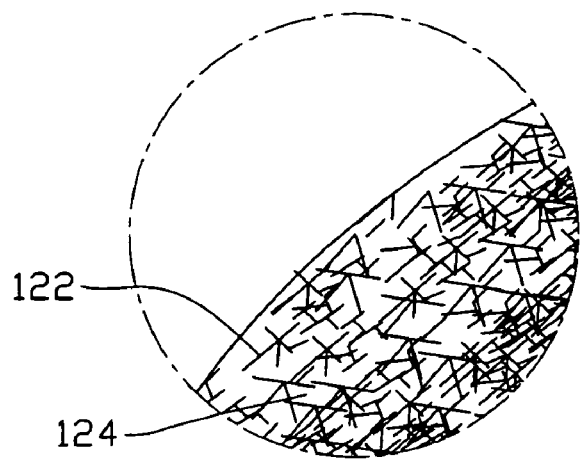
FIG. 2 is an enlarged view a circled portion II of FIG. 1, showing a plurality of carbon nanotubes and a plurality of nano-scale pores defined therebetween.
Figure 3:
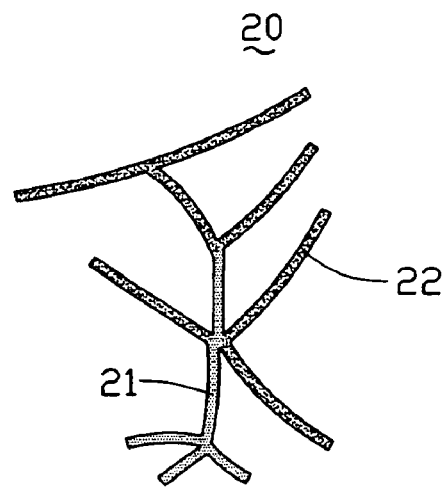
FIG. 3 is an enlarged view of a three-dimensional junction carbon nanotube in accordance with an exemplary embodiment of the present invention.
Figure 4:
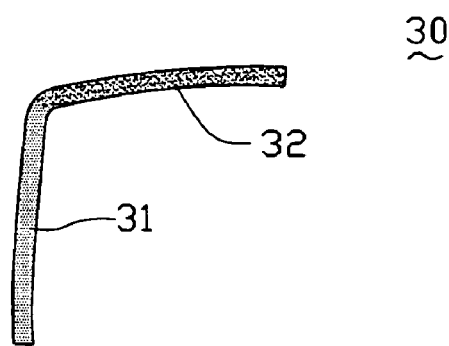
FIG. 4 is an enlarged view of an L-junction carbon nanotube in accordance with an exemplary embodiment of the present invention.
Figure 5:
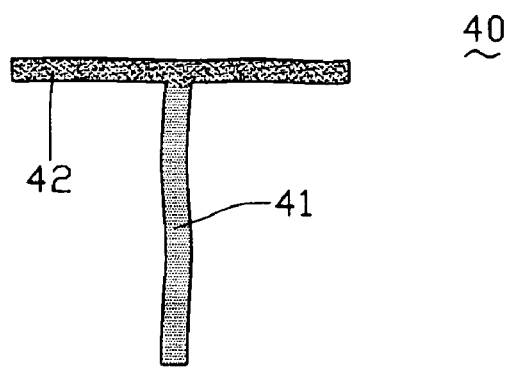
FIG. 5 is an enlarged view of a T-junction carbon nanotube in accordance with an exemplary embodiment of the present invention.
Figure 6:
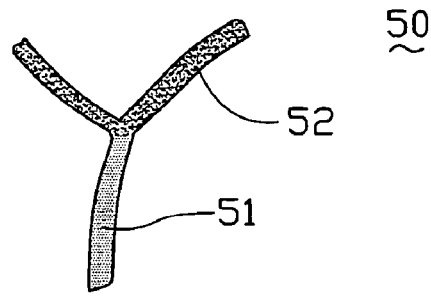
FIG. 6 is an enlarged view of a Y-junction carbon nanotube in accordance with an exemplary embodiment of the present invention.
Figure 7:
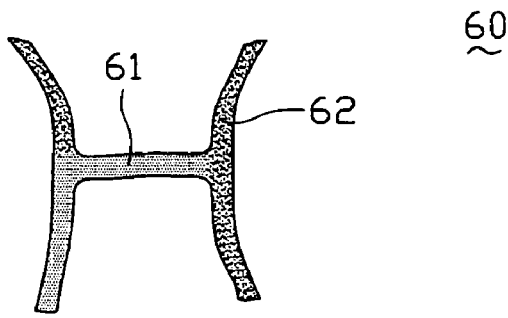
FIG. 7 is an enlarged view of a H-junction carbon nanotube in accordance with an exemplary embodiment of the present invention.

Referring to FIG. 2, the filtration membrane 12 is generally configured as a network formed by aggregating a plurality of disordered carbon nanotubes 122. All the carbon nanotubes 122 form bonds with one or more adjacent carbon nanotubes 122 by Van der Waals forces. Thus, a plurality of nano-scale pores 124 is thereby defined between the carbon nanotubes 122. Preferably, an average diameter of the nano-scale pores 124 is substantially in the range of about 5~65 nanometers. A diameter of each of the carbon nanotubes 122 is substantially in the range of about 15~100 nanometers. Preferably, the diameter of each of the carbon nanotubes 122 is substantially in the range of about 15~60 nanometers.

Referring to FIGS. 3 to 7, the carbon nanotubes 122 include a plurality of multifunction carbon nanotubes. The multi-junction carbon nanotubes are generally selected from the group consisting of two-dimensional junction carbon nanotubes 30, 40, 50, 60, three-dimensional junction carbon nanotubes 20 and an admixture thereof Each of the three-dimensional junction carbon nanotubes 20 is configured by a main stem 21 and at least two branches 22 extending from the stem 21. The main stem 21 is not located in a plane formed by at least two of the branches 22.

Referring to FIGS. 4 to 7, each of the two-dimensional junction carbon nanotubes 30, 40, 50, 60 is configured by a main stem 31, 41, 51, 61 and at least one branch 32, 42, 52, 62 extending from the stem 31, 41, 51, 61. Generally, the two-dimensional junction carbon nanotubes 30, 40, 50, 60 are selected from the group consisting of L-junction carbon nanotubes 30, T-junction carbon nanotubes 40, Y-junction carbon nanotubes 50, H-junction carbon nanotubes 60, and an admixture composed of at least two such carbon nanotubes. The L-junction carbon nanotube 30 is typically configured by a main stem 31 and a single branch 32. The branch 32 extends from an end of the stem 31, and cooperates with the stem 31 to form a substantially L-shaped configuration. Thus the L-junction carbon nanotube 30 has two terminals. The T-junction carbon nanotube 40 is typically configured by a main stem 41, and two branches 42 extending from a same end of the stem 41 respectively. The branches 42 extend in two opposite directions, and thereby cooperate with the stem 41 to form a substantially T-shaped configuration. The stem 41 and the branches 42 are substantially located in a same plane. Thus the T-junction carbon nanotube 40 has three terminals. The Y-junction carbon nanotube 50 is typically configured by a main stem 51 and two branches 52. The branches 52 extend from a same end of the main stem 51 respectively, and thereby cooperate with the stem 51 to form a substantially Y-shaped configuration. The main stem 51 and the branches 52 are substantially located in a same plane. Thus the Y-junction carbon nanotube 50 has three terminals. The H-junction carbon nanotube 60 is typically configured by a main stem 61 and three branches 62. The stem 61 is typically substantially L-shaped. The branches 62 extend from two ends of the stem 61 respectively, and thereby cooperate with the stem 61 to form a substantially H-shaped configuration. The main stem 61 and the branches 62 are substantially located in a same plane. Thus the H-junction carbon nanotube 60 has four terminals.

The porous supporting component 14 has a plurality of micro-scale pores (not shown) extending therethrough. The porous supporting component 14 is generally made from one of a ceramic material and a fiber aggregation material. The fiber aggregation material is preferably made from one of a cellulose fiber material, a glass fiber material, and a polymer fiber material.

A method for making the above-described nano-scale filter 10 generally includes the steps of:

(i) providing a plurality of carbon nanotubes 122, and a liquid medium, the carbon nanotubes 122 including a plurality of multi-junction carbon nanotubes, the multi-junction carbon nanotubes being selected from the group consisting of two-dimensional junction carbon nanotubes 30, 40, 50, 60, three-dimensional junction carbon nanotubes 20, and an admixture thereof, with a diameter of each of the carbon nanotubes 122 being substantially in the range of about 15~100 nanometers;

(ii) oxidizing the carbon nanotubes 122;

(iii) dispersing the carbon nanotubes 122 into the liquid medium to form a suspension;

(iv) filtering the suspension by using a filtration element;

(v) firing the filtration element with the carbon nanotubes 122 located thereon under appropriate conditions, for example, under a temperature of about 20° C.~100° C. in a vacuum for a period of about 1~3 hours, whereby substantially all the carbon nanotubes 122 form bonds with one or more corresponding adjacent carbon nanotubes 122, thereby defining a plurality of nano-scale pores 124 therebetween, and forming a carbon nanotube filtration membrane 12 on the filtration element; and (vi) removing the filtration membrane 12 from the filtration element, and attaching the filtration membrane 12 onto a porous supporting component 14 with a plurality of micro-scale pores therein, thereby forming the nano-scale filter 10.

In step (i), the carbon nanotubes 122 are formed by, for example, a thermal chemical vapor deposition method, a hot filament chemical vapor deposition method, a nickelocene high temperature decomposition method, an alumina template method, etc. Carbon nanotubes 122 formed by the hot filament chemical vapor deposition method or the nickelocene high temperature decomposition method include a plurality of Y-junction carbon nanotubes 50, with the a diameters of each of the carbon nanotubes 122 being generally in the range of about 15~100 nanometers. Carbon nanotubes 122 formed by the alumina template method include a plurality of Y-junction carbon nanotubes 50, with the a diameter of each of the carbon nanotubes 122 being generally in the range of about 35~60nanometers.

The carbon nanotubes 122 formed by the thermal chemical vapor deposition method include a plurality of Y-junction carbon nanotubes 50, T-junction carbon nanotubes 40, H-junction carbon nanotubes 60, and/or three-dimensional junction carbon nanotubes 20. The diameter of each of the carbon nanotubes 122 is generally in the range of about 20~50 nanometers. The thermal chemical vapor deposition method generally includes the steps of:

(a) providing a clean monocrystal silicon substrate;

(b) placing the substrate into a quartz boat, and placing the quartz boat into a sealed chamber;

(c) placing a ceramic boat with an activator (e.g. iron powder) into the chamber, whereby the ceramic boat is spaced a distance of about 5 cm above the substrate; and (d) heating the chamber at a temperature of about 1100° C. and filling reaction gas (e.g. $CH_4$) into the chamber, thereby obtaining the carbon nanotubes 122.

Preferably, in the thermal chemical vapor deposition method, an additional step (e) of cleaning the carbon nanotubes 122 is also performed, in order to remove any impurities (e.g. originating from the activator) therefrom. In step (e), the following exemplary series of processes can be performed: an acid pickling process, a water diluting process, a water cleaning process, a centrifugation process, and an oxidizing process.

In step (iii), the liquid medium is generally one item selected from water, an organic solvent, and any suitable admixture thereof The organic solvent is generally one item selected from carbinol, alcohol, glycerol, surface-active agent, polyethylene glycol, polyethylene imine, polypropylene glycol, and any suitable admixture thereof. Preferably, the liquid medium is carbinol. Furthermore, low power ultrasound is preferably applied in step (iii), to improve the dispersion of the carbon nanotubes. In particular, the carbon nanotubes and the liquid medium are placed into a trough, and are treated with ultrasound for a period of about 20~30 minutes.

In step (iv), the filtration element is preferably a filtration film with a thickness of about 0.1~0.5 μm. The filtration film is made from a poly material (e.g. a polycarbonate material).

In step (v), diameters of the nano-scale pores 124 formed between the carbon nanotubes 122 are generally dependent on a thickness of the filtration membrane 12. The greater the thickness of the filtration membrane 12 is able to be during the formation of the filtration membrane 12, the smaller the diameters of the nano-scale pores 124 are. Preferably, an average diameter of the nano-scale pores 124 is substantially in the range of about 5~65 nanometers.

In an alternative method for making the above-described nano-scale filter 10, a porous supporting component 14 can be provided as a filtration element to filter the suspension. If the porous supporting component 14 is used, the above-described step (vi) can be omitted.

In another alternative method for making the above-mentioned nano-scale filter 10, after step (v), an extra step of deoxidizing the filtration membrane 12 at a temperature of about 600° C. in a vacuum can be performed. This can increase the specific surface area and porosity of the nano-scale filter 10 obtained.

In a further alternative method for making the above-mentioned nano-scale filter 10, in step (iv), during the filtration, intermittent shocking treatment can be applied. This disperses the carbon nanotubes 122 and facilitates the filtration membrane 12 being formed with a uniform thickness. For example, a high power ultrasound shocking device (e.g. a Branson Sonifier 450) can be used. Each shocking process is generally sustained for a time period of about 30~60 seconds.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

I claim:

1. A method for making a nano-scale filter, comprising:

providing a plurality of carbon nanotubes, said carbon nanotubes comprising a plurality of multi-junction carbon nanotubes, said multi-junction carbon nanotubes being selected from the group consisting of two-dimensional junction carbon nanotubes, three-dimensional junction carbon nanotubes and an admixture thereof, a diameter of each of said carbon nanotubes being in the range of about 15~100 nanometers;

oxidizing said carbon nanotubes;

dispersing said carbon nanotubes into a liquid medium to form a suspension;

filtering said suspension by a filtration film;

firing said filtration film with said carbon nanotubes thereon at a temperature of about 20° C.~100° C. in a vacuum for about 1~3 hours, whereby some or all of said carbon nanotubes form bands with at least one corresponding adjacent carbon nanotube thereby forming a carbon nanotube filtration membrane with a plurality of nano-scale pores therebetween; and removing said carbon nanotube filtration membrane from said filtration film, and attaching said carbon nanotube filtration membrane onto a porous supporting component to provide said nano-scale filter.

2. The method for making a nano-scale filter as claimed in claim 1, wherein the diameter of each of said carbon nanotubes is in the range of about 15~60 nanometers.

3. The method for making a nano-scale filter as claimed in claim 1, wherein said liquid medium is one item selected from the group consisting of water, an organic solvent, and any admixture thereof, and said organic solvent is one item selected from the group consisting of carbinol, alcohol, glycerol, surface-active agent, polyethylene glycol, polyethylene imine, polypropylene glycol, and any admixture thereof.

4. The method for making a nano-scale filter as claimed in claim 1, wherein said carbon nanotubes are dispersed in said liquid medium using low power ultrasound for about 20~30 minutes.

5. The method for making a nano-scale filter as claimed in claim 1, wherein a thickness of said filtration film is in the range of about 0.1~0.5 μn, and said filtration film is made from a poly material.

6. The method for making a nano-scale filter as claimed in claim 1, wherein during the filtering of said suspension, intermittent shocking treatment is performed by using an ultrasound shocking device, and each shocking process is sustained for about 30~60 seconds.

7. The method for making a nano-scale filter as claimed in claim 1, wherein before removing said carbon nanotube filtration membrane from said filtration film, deoxidizing said carbon nanotube filtration membrane at a temperature of about 600° C. is performed.

* * * * *

UNITED STATES PATENT AND TRADEMARK OFFICE
CERTIFICATE OF CORRECTION

PATENT NO. : 7,625,426 B2
APPLICATION NO. : 11/438023
DATED : December 1, 2009
INVENTOR(S) : Mong-Tung Lin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 808 days.

Signed and Sealed this

Twenty-first Day of December, 2010

David J. Kappos
*Director of the United States Patent and Trademark Office*